United States Patent
Yamamoto (10) Patent No.: US 6,668,096 B1
(45) Date of Patent: Dec. 23, 2003

(54) IMAGE VERIFICATION METHOD

(75) Inventor: Hiroyasu Yamamoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/335,051

(22) Filed: Jun. 16, 1999

(30) Foreign Application Priority Data

Jun. 16, 1998 (JP) ............................. 10-168704

(51) Int. Cl.$^7$ .................................. G03B 17/24
(52) U.S. Cl. ........................... 382/254; 382/260
(58) Field of Search ................... 382/254–269; 349/96–112

(56) References Cited

U.S. PATENT DOCUMENTS

| 4,646,252 A | * | 2/1987 | Terashita | 355/77 |
| 5,467,168 A | * | 11/1995 | Kinjo et al. | 355/40 |
| 6,246,494 B1 | * | 6/2001 | Tatsumi | 358/506 |

FOREIGN PATENT DOCUMENTS

| JP | 47-85119 | 4/1974 |
| JP | 52-92365 | 10/1988 |

* cited by examiner

*Primary Examiner*—Thomas D. Lee
*Assistant Examiner*—Stephen Brinich
(74) *Attorney, Agent, or Firm*—Birch, Stewart, Kolasch & Birch, LLP (57) ABSTRACT

The image verification method for a print image and a representation image judges a degree of similarity between any individual frames using all of or a part of input image data, sets image processing conditions such that print finishing or representation images of respective frames with high similarity therebetween are the same with or similar to each other, represents in a verification picture plane a verification image of the frame which has been subjected to image processing under the thus set image processing conditions and performing similarity verification processing such that, when a user's correction of the image processing conditions is performed on a certain frame, the image processing conditions of a similar frame can automatically be subjected to the user's correction with different intensity changeable in accordance with the degree of similarity to represent the verification image anew. The method decreases uneven finishing among similar frames, provides the print or the representation image of stable quality as well as increases verification efficiency by a user or an operator.

17 Claims, 5 Drawing Sheets

IMAGE VERIFICATION METHOD

BACKGROUND OF THE INVENTION

This invention relates to the technical field of an image verification method for a print image or a representation image in case of being subjected an inputted image to image processing and then outputting as a print or representing on a display device.

Heretofore, the images recorded on photographic films such as negatives and reversals (which are hereunder referred to simply as "films") have been commonly printed on light-sensitive materials (photographic paper) by means of direct (analog) exposure in which the film image is projected onto the light-sensitive material to achieve its areal exposure.

A new technology has recently been introduced and this is a printer that relies upon digital exposure. Briefly, the image recorded on a film is read photoelectrically, converted to digital signals and subjected to various image processing operations to produce output image data for recording purposes; recording light that has been modulated in accordance with the output image data is used to scan and expose a light-sensitive material to record a latent image, which is subsequently developed to produce a (finished) print. The printer operating on this principle has been commercialized as a digital photoprinter.

In digital photoprinters, the image is converted into digital image data and exposing conditions to be used in a printing step can be determined by processing that image data. Hence, by using such digital photoprinters, the correction of dropouts or blocked-ups due to photography with rear light or an electronic flash, sharpening, the correction of color or density failures, the correction of under-or over-exposure, the correction of the insufficiency of marginal light and various other kinds of image processing can be performed effectively enough to produce prints of high quality that have heretofore been impossible to obtain by the direct exposure technique. Having these features, the digital photoprinter is composed of the following three basic components; a scanner (image reading apparatus) that reads the image recorded on a film photoelectrically; an image processing apparatus that performs image processing of the read image to obtain output image data (exposing conditions) for recording; and a printer (image recording apparatus) that scan exposes a light-sensitive material in accordance with the output image data and performs development and other necessary processes to produce a photographic print.

In the scanner, the reading light emitted from a light source is allowed to be incident on the film, thereby producing projected light that carries the image recorded on the film; the projected light is then passed through an imaging lens to be focused on an image sensor such as a CCD sensor which performs photoelectric conversion to read the image, which is optionally subjected to various kinds of image processing before it is sent to the image processing apparatus as the input image data (image data signals) from the film.

In the image processing apparatus, the image processing conditions are set on the basis of the input image data that has been read with the scanner and then the input image data is subjected to image processing in accordance with the thus set image processing conditions, thereby producing output image data for image recording (i.e., exposing conditions) that are subsequently sent to the printer.

In the printer, if it is an apparatus that adopts exposure by scanning with optical beams, the optical beams are modulated in accordance with the output image data sent from the image processing apparatus, a light sensitive material is two-dimensionally scanned and exposed with the light beams (printed) to thereby form a latent image; then, the exposed light-sensitive Material is subjected to preset development processing and other various kinds of processing to produce a (photographic) print on which the image that has been recorded on the film is reproduced.

As described above, the digital photoprinter has the following features. That is, the images which were recorded on the film can be outputted as the print; in addition to the above feature, images which have bad image reproducibility due to inappropriate photographing conditions when they were photographed, are subjected to digital image processing for the correction of a backlighted scene, high contrast scene, underexposed negative film, sharpness, insufficient marginal light and the like, whereby the images can be easily outputted as beautiful images of high quality as the print.

When the images recorded on the photographic film are printed onto the light-sensitive material by any of the above-mentioned direct exposure (analog exposure) and digital exposure, if a number of images having similar scenes are present in one photographed film or if a plurality of image data directly obtained by photographing a plurality of subjects with such as a digital camera or a video camera are read out of an image recording medium and a number of images having similar scenes are present among the thus read images, it will be inconvenient for a user who is to enjoy an output print service to receive finished prints differing in quality from each other though similar scenes were recorded thereon. Therefore, image data have normally been subjected to image processing so as to finish the print up such that print images of similar scenes appear the same.

In order to perform the above, as an exemplified verification method, frames are represented on a monitor one by one on which a user or an operator performs a visual judgement on similarity and, if it is judged that the present frame is similar to the preceding one, image processing adjusted by manipulating keys is performed so that the present frame may be of same finishing quality as the preceding frame.

However, it is troublesome for the operator or the user to perform the visual judgement on similarity and, unless the operator or the user is well skilled, it takes time in performing the judgement on similarity as well as results of judgements vary from one to the other.

To solve she above problem, verification methods for performing judgement on similarity between any individual frames based on image data or image information of each frame have been proposed.

As such verification methods, for example, disclosed are a method for judging similarity of scenes based on an amount of a judgement formula using a plurality of characteristic quantities (in Examined Published Japanese Patent Application (kokoku) No. 63-52367) and a method for judging similarity of two consecutive frames utilizing LATD (large area transmission density) and a detected amount of photographing light quality (in Unexamined Published Japanese Patent Application (kokai) No. 49-40942).

However, an invention described in the latter application No. 49-40942 has difficulty in judging whether a frame of interest has a standard scene or a scene influenced with color failure, density failure or light quality of a light source if LATD is only used when printing exposure light quantity of the frame of interest is determined. The latter application No. 49-40942, moreover, determines the printing light quantity of the frame of interest by judging whether LATD or light quality of the light source is same in the consecutive two frames and, then, by comparing the printing exposure light quantity of the frame of interest with that of a frame which is judged as same to prevent an occasion that one of two sane scenes which have LATD difference, for example, density difference of 0.03 or less therebetween is corrected and the other of the two same scenes is not corrected.

An invention described in the former application No. 63-52367 judges whether two frames are of same scene or not based on whether threshold of judgement formula using characteristics quantities such as LATD, average density of upper, lower, right-side and left-side portions of a picture, minimum and maximum density, contrast of the picture as a whole and the like is large or small and, if the two frames are judged as having the same scene, correction is performed such that the two frames are provided with same exposure light quantity.

The above two prior arts only judges whether two frames are of same scene or not and, if the two frames are judged to be of same scene, the two frames are finished so as to have the same density by providing them the same exposure light quantity. Accordingly, if the two frames are completely the same, they will be appropriately finished whereas, if they are not completely the same but similar, they are in some cases corrected to be the same and in other cases not to be the same. As a result, the print which gives sense of incongruity to the user will be served.

SUMMARY OF THE INVENTION

An object, therefore, of the invention is to solve the above problems of the prior art methods and to provide an image verification method for a print image and a representation image which is able to improve the above-described prior art methods, to decrease uneven finishing among similar frames in one case, to provide stable print quality and image representation quality on a representation (display) device, and to allow verification efficiency of a user or an operator to be increased.

The stated object of the invention can be attained by providing a print verification method comprising the steps of:

performing similar frame judgement processing for judging similarity between any individual frames using all of or a part of image data which is obtained by reading images in a plurality of frames on a film original to be processed or which is obtained from an image data recording media;

setting image processing conditions such that print finishing of frames with high similarity therebetween is the same with or similar to each other;

representing in a verification picture plane verification images of the frames which have been subjected to image processing under the thus set image processing conditions; and performing similarity verification processing such that, when a user's correction of the image processing conditions is performed on a certain frame, the image processing conditions of a similar frame or similar frames which has been judged to be similar to the certain frame at the similar frame judgement processing can also automatically be subjected to the user's correction with different intensity changeable in accordance with a degree of similarity to represent the verification image anew.

The present invention provides an image verification method, comprising the steps of:

performing similar frame judgement processing for judging similarity between any individual frames using all of or a part of image data which is obtained by reading images in a plurality of frames on a film original to be processed or which is obtained from an image data recording media;

setting image processing conditions such that representation images of frames with high similarity therebetween is the same with or similar to each other;

representing in a verification picture plane verification images of the frames which have been subjected to image processing under the thus set image processing conditions; and performing similarity verification processing such that, when a user's correction of the image processing conditions is performed on a certain frame, the image processing conditions of a similar frame or similar frames which has been judged to be similar to the certain frame at the similar frame judgement processing can also automatically be subjected to the user's correction with different intensity changeable in accordance with a degree of similarity to represent the verification image anew.

In these aspects, the above-described image processing conditions include at least one of density, color balance, gradation and contrast.

Moreover, once the user's correction of the image processing conditions is performed on the certain frame, the image processing conditions of the certain frame are not automatically changed by the user's correction performed on image processing conditions of other similar frame or frames which is similar to the certain frame.

It is preferable that the above-described plurality of frames to be judged in the similar frame verification processing is one case of film original or one case of image data recording media.

It is preferable that images in the plurality of frames are represented over a plurality of the verification picture planes.

In this case, in the above-described similarity verification processing, when the user's correction is performed on a frame within one of the verification picture planes, other similar frame or frames in the one verification picture plane and the similar frame or frames within other verification picture plane are preferably subjected to the user's correction with different intensity changeable in accordance with the degree of similarity to represent the verification picture anew.

It is Preferable that whether the similarity verification processing As performed or not performed can be switched on a basis of each case of the film original or the image data recording media or on a basis of each verification picture plane.

Moreover, in the similarity verification processing, when other frame or frames within one verification picture plane is similar to one frame within the one verification picture plane, a function which represents in the one verification picture plane at least one of a mark showing that the other frame or frames is similar and a degree of similarity of the other frame or frames is preferably provided.

In the similar frame judgement processing, when the degree of similarity between any individual frames is judged from the image data, weighting is preferably performed in accordance with a distance between any individual frames such that the degree of similarity becomes smaller as the distance between any individual frames becomes larger, or, when the distance between any individual frames is larger than a specified distance, calculation. of the similarity is preferably, forcibly omitted and the similarity becomes 0.

In the invention, it is preferable that the image processing conditions themselves set by the similarity verification processing are sent to an output apparatus for printing the image in the frame on the film original and for outputting a print image.

Preferably, a verification image data itself which has been corrected by the similarity verification processing is sent to an output apparatus for printing the image in the frame on the film original and for outputting a print image.

Preferably, the image data is subjected to image processing in accordance with the image processing conditions set n the similarity verification processing and, thereafter, is sent to the output apparatus for outputting the print image.

Preferably, output image data obtained by performing output image reading after the similarity verification processing has been performed is subjected to image processing in accordance with the image processing conditions set in the similarity verification processing and, thereafter, is sent to the output apparatus for outputting the print image.

Alternative embodiment of the invention provides a print image verification method comprising the steps of:

prescanning a plurality of frames in a film original to be processed;

performing similar frame judgement processing for judging a degree of similarity between any individual frames based on a thus obtained prescanned image data;

setting image processing conditions such that print finishing of frames with a high degree of similarity therebetween is the same with or similar to each other;

being subjected a prescanned image in a frame to image processing under the thus set image processing conditions;

representing the thus processed prescanned image in the frame on a verification picture plane;

performing, when a user's correction of the image processing conditions is performed on a certain frame, the user's correction with different intensity changeable in accordance with the degree of similarity automatically on the image processing conditions of a similar frame which has been judged to be similar to the certain frame in the similar frame judgement processing and, thereafter, representing the verification image anew;

performing fine scan to obtain fire scanned image data after the similarity verification processing is finished;

subjecting the thus obtained fine scanned image data to image processing under the image processing conditions set in the similarity verification processing; and sending the thus processed fine scanned image data to an output apparatus for outputting a print image.

DETAILED DESCRIPTION OF THE INVENTION

The image verification method according to the invention applied to a digital photoprinter is now described in detail with reference to the preferred embodiments shown in the accompanying drawings.

Figure 1:
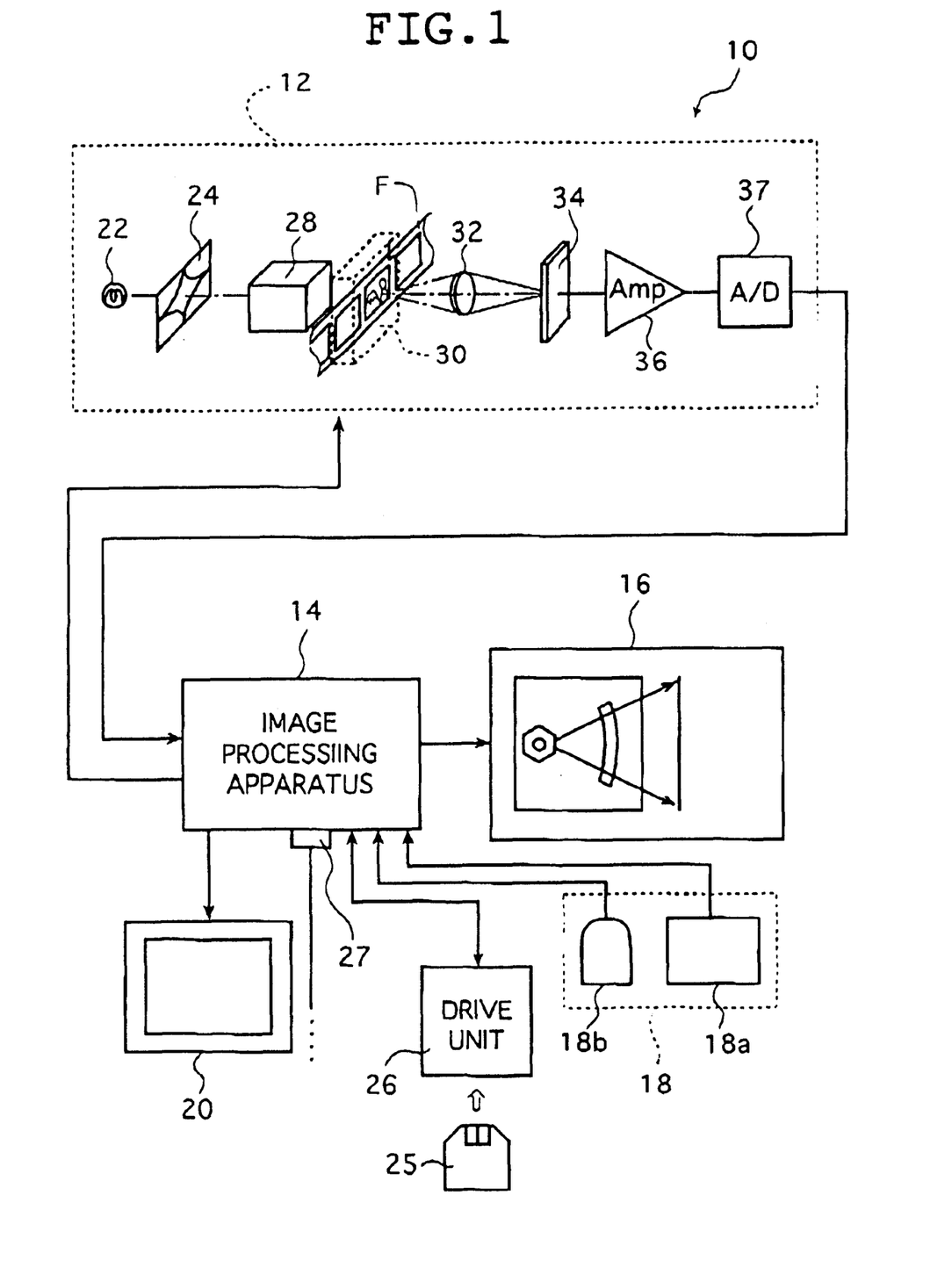
FIG. 1 is a clock diagram showing an embodiment of a digital photoprinter applying an image verification method of the invention for a print image and a representation image.

FIG. 1 is a block diagram showing an embodiment of a digital photoprinter applying an image verification method for a print image and a representation image of the invention.

The digital photoprinter (hereinafter called as photoprinter) 10 shown in FIG. 1 is basically composed of the following units: a scanner (image reading apparatus) 12 that reads the image recorded on a film F photoelectrically; an image processing apparatus 14 that processes the captured image data (image information), manipulates and controls the photoprinter 10 as a whole as well as performs other necessary processings; and a printer 16 that performs area exposure on a light-sensitive material by a light beam modulated in accordance with the image data outputted from the image processing apparatus 14 and performs a wet development process to output it as a (finished) print.

Connected to the image processing apparatus 14 are a manipulating unit 18 having a keyboard 18a and a mouse 18b for inputting and setting various conditions, selecting and commanding a specific processing step and entering a command and so forth for effecting color/density correction, as well as a monitor 20 for representing the image captured with the scanner 12, various manipulative commands and pictures for setting and registering various conditions.

The present invention can use various kinds of image data supply sources, in addition to the scanner 12 which optically reads an image recorded on a film such as a negative film and reversal film. Exemplified as the image data supply sources are an image reading device for reading an image of a reflection original; communication means such as computer communication and so forth (including communication means operated through modem); a photographing device such as a digital camera, a digital video camera and the like and a memory contained therein; an image data recording medium for the digital camera such as a PC card, smart media and the like; a general-purpose image data recording medium such as an FD (floppy disc), an MO (magneto-optical recording medium) and the like; and an image file and the like of these image data recording media and image storing device. The invention can also utilize not only the printer 16 which outputs the image verified by the image verification method of the invention as the photographic print but also the communication means such as computer communication and the like, the image data recording medium and these image files which have been described above as the image data output site to which the image data of the verified images. The image data supply source and a site to which verified image data is outputted can be connected to the image processing apparatus 14 directly or through the drive unit thereof. Therefore, the image processing apparatus 14 can receive digital image data from the image data supply source and output the verified image data to the image data output site.

In particular, in the illustrated photoprinter 10, a drive unit 26 is connected to the image processing apparatus 14 in order not only to read and capture image data from a recording medium for a digital camera to which digital image data photographed with the digital camera or the like is recorded and from a general-purpose image recording medium 25, but also to write (record) the verified image data into these image data recording medium 25. Exemplified as the former recording medium are a card memory such as a PCMCIA (PC card), ATA card, compact flash card, etc. and a smart medium and the like. Further, exemplified as the latter general-purpose recording medium 25 are an FD (floppy disc), CD-R (recordable compact disc), MO (magneto-optical disk), DVD (digital versatile disc), Zip, etc. Further, the image processing apparatus 14 is provided with a slot 27 or the like so that it captures or outputs digital image data by being connected to various kinds of data supply sources such as the scanner, image processing device, image data storing device and the like of a (personal) computer, image representation (display) device (including CRT, LCD, etc. used as a monitor), digital camera and other digital photo printer directly through a cable (for example, RS232C) or through a communication network.

In the illustrated example, input signals (digital image data) are supplied to the image processing apparatus 14 from various kinds of image data supply sources such as the scanner 12, the drive unit 26 and so forth and, thereafter, the supplied input signals are sent to the printer 16, the drive unit 26, the image representation device and the like. However, in the following description, an example that digital image data is supplied mainly from the scanner 12 to the image processing apparatus 14 where the supplied digital image data is verified and, thereafter, the verified image data is sent to the printer 16 will be described as a representative example.

The scanner 12 is an apparatus for photoelectrically reading the images recorded or the film F comprises a light source 22, a variable diaphragm 24, a diffuser box 28 which diffuses the reading light incident on the film F so that it becomes uniform across the plane of the film F, an imaging lens unit 32, a CCD sensor capable of reading images on the film, amplifier (Amp) 36 and A/D (analog/digital) converter 37 as well as a dedicated carrier 30 which can be loaded into a body of the scanner 12.

Figure 2A:
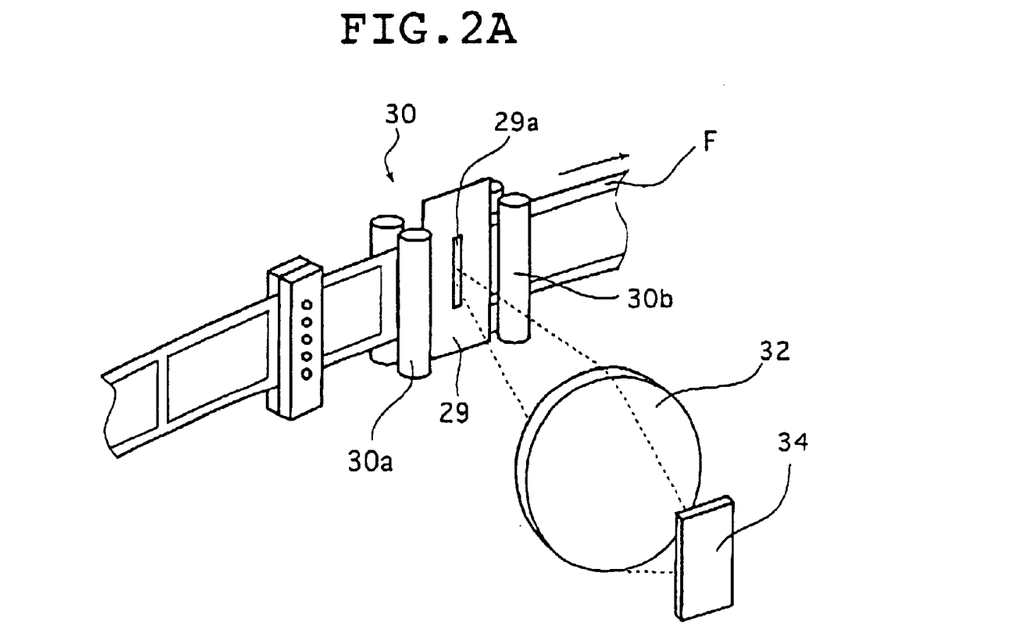
FIG. 2A is a schematic perspective view showing an embodiment of a carrier to be installed in the digital photoprinter shown in FIG. 1 when a film is mounted on the carrier.
Figure 2B:
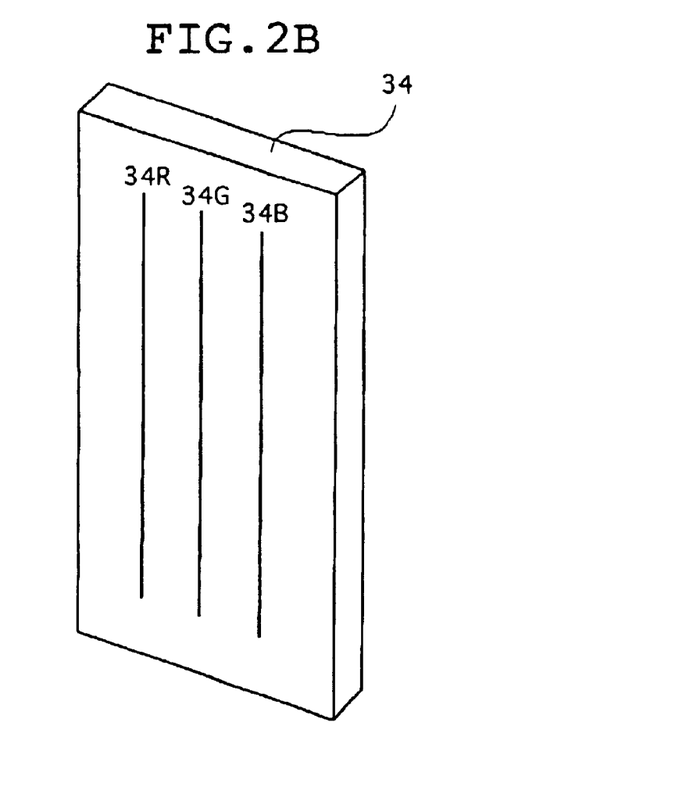
FIG. 2B is a schematic perspective view showing an embodiment of a CCD sensor shown in FIG. 1.

As the carrier 30, various types of dedicated carriers which correspond to elongated films such as, for example, a 24-exposure film of 135 size, a cartridge for the Advanced Photo System (APS) film and the like are prepared. As shown in FIGS. 2A and 2B schematically, the carrier 30 includes a plurality of transport rollers pair 30a and 30b, and a mask 29 having a slit 29a. The transport rollers 30a and 30b are disposed on the opposite sides of a preset reading position in an auxiliary scanning direction which is perpendicular to the main scanning direction. They transport the film F with its length being parallel to the auxiliary scanning direction which is perpendicular to a direction in which the line CCD sensor of the CCD sensor 34 extends (main scanning direction) while holding the film F at the preset reading position. The slit 29a defines the light projected from the film F so that the light has a preset slit shape, is located in registry with the reading position and extends in the main scanning direction.

As shown in FIG. 2B, the CCD sensor 34 is a line sensor comprising a line CCD sensor 34R for reading R image, a line CCD sensor 34G for reading G image, and a line CCD sensor 34B for reading B image. The light projected from the film F is separated into three primary colors R, G and B and captured photoelectrically by means of the CCD sensor.

The reading light emitted from the light source 22 is adjusted in quantity by passing through the variable diaphragm 24, then uniformly diffused in the diffuser box 28; the thus treated reading light is incident on the film F which is transported while being held at the preset reading position by the carrier 30, through which it is transmitted to produce projected light that carries the image in a frame of interest recorded on the film F.

The light projected from the film F passes through the imaging lens unit 32 to be focused on the light-receiving plane of the CCD sensor 34 and read with the CCD sensor 34 photoelectrically; the resulting output signal is amplified with the amplifier 36, converted to the digital image data with A/D converter 37 and sent to the image processing apparatus 14 as an input digital image data.

It should be noted that the scanner 12 is by no means limited to a type that relies upon the slit scan capturing described above but that it may be a CCD area sensor making use of a real exposure (a real reading) by which the entire surface of the image in one frame is captured at a time. In this alternative approach, R, G and B color filters are interposed between the variable diaphragm 24 and the diffuser box 28 shown in FIG. 1. In this case, the projected light which carries the image in the frame recorded on the film F may be obtained in a manner that the light having passed through the color filters and subjected to R, G and B color adjustment is incident on one frame of the film F and passes therethrough. At the time, the color filters must be sequentially inserted to the light passage from the light source three times to separate the image to R, G and B primary colors.

When the scanner 12 reads the image through the CCD sensor, the scanner 12 carries out prescan for reading the image at low resolution for determining image processing conditions and the like prior to image reading (fine scan) for outputting a print P, checks similarity of an image frame, determines image processing conditions and, after performing confirmation and adjustment on the monitor, the final scan is carried cut to read the image at high resolution. To perform the above steps, scanning is carried out twice for the prescan and the fine scan. Accordingly, when the color filters as well as the CCD area sensor are used, the scanning is to be carried out a total of six times. in the illustrated example, all the images recorded on the film F are captured at a time in the prescan and, thereafter, based on the thus prescanned image data, a fine scan reading condition is set as well as similarity judging processing and similarity verifying processing of an image frame which will be described later are performed. Subsequently, after image processing conditions are set, the fine scan is executed.

Figure 3:
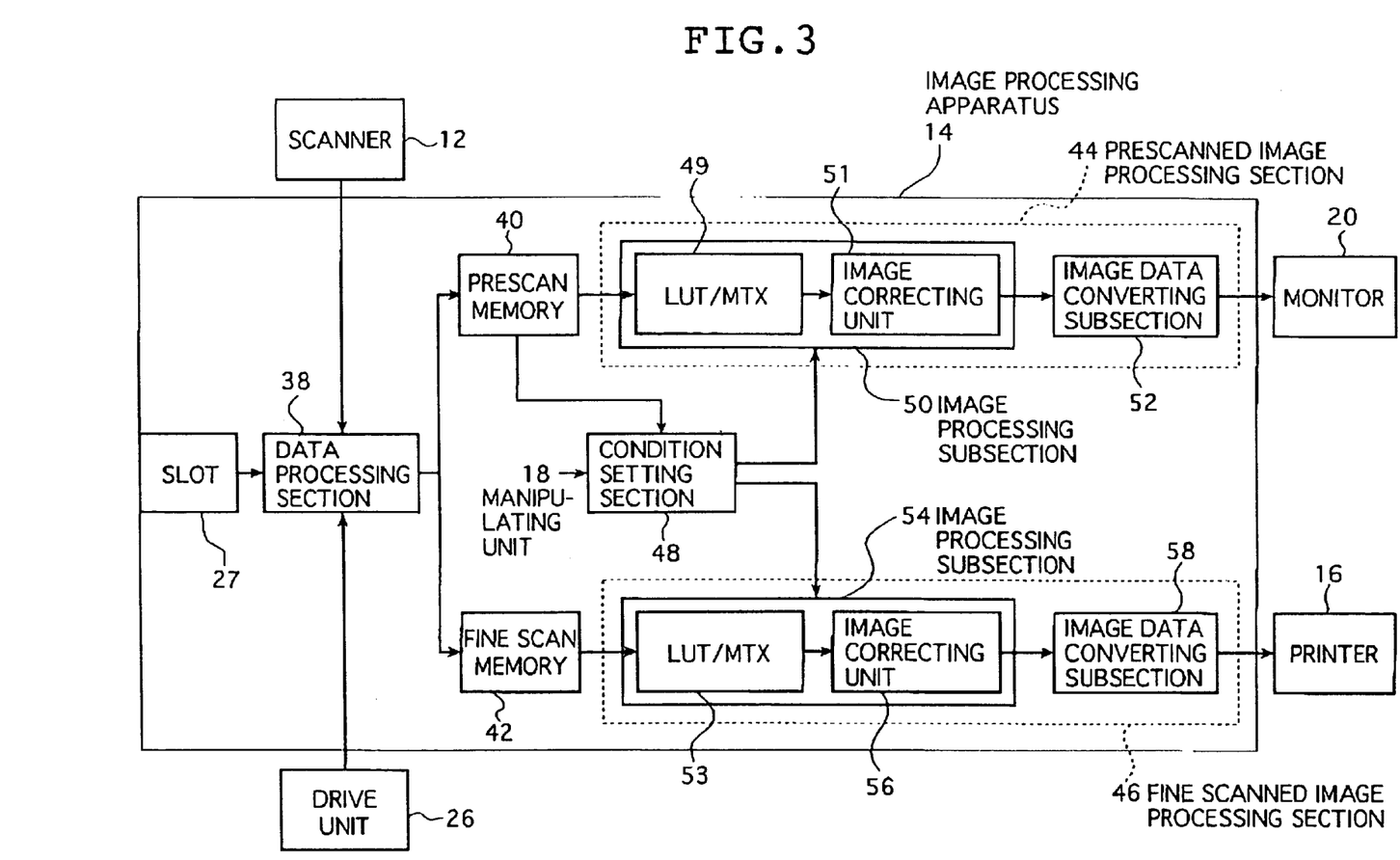
FIG. 3 is a block diagram of an embodiment of an image processing apparatus shown in FIG. 1.

A block diagram of the image processing apparatus 14 is shown in FIG. 3. The image processing apparatus 14 which subjects the input image data captured with the scanner 12 to preset image processing and output the processed input image data to an image representing unit such as the printer 16, the monitor 20 or the like comprises a data processing section 38, a prescan memory 40, a fine scan memory 42, a prescanned image processing section 44, a fine scanned image processing section 46 and a condition setting section 48.

In the data processing section 38, an output signal (digital image data) associated with each of R, G and B, which has been delivered from the scanner 12, is subjected to Log conversion, DC offset correction, dark correction, shading correction and so forth to form digital input image data. The thus formed digital input image data is stored in the prescan memory 40, if it is based on the prescanned (image) data whereas the thus formed digital input image data is stored in the fine scan memory 42, if it is based on the fine scanned (image) data. It should be noted that, in the illustrated example, A/D conversion is performed in the scanner 12 and the converted digital image data is inputted to the data processing section 38 of the image processing apparatus 14 but the A/D conversion may not be performed in the scanner 12 but may be performed in the data processing section 38 of the image processing apparatus 14 where Log conversion and other various corrections may be executed.

The prescan memory 40 and the fine scan memory 42 store digitalized image data processed in the data processing section 38 which are then optionally read out in the prescanned image processing section 44 or in the fine scanned image processing section 46 to be subjected to image processing and, then, to be outputted.

The prescanned image processing section 44 comprises an image processing subsection 50 and an image data converting subsection 52. The image processing subsection 50 comprises an LUT/MTX calculating unit 49 which performs color balance adjustment, contrast correction and density correction, and an image correcting unit 51 which performs correction processing on distortion aberration and lateral chromatic aberration which caused by aberration characteristics of a lens, sharpness processing, dodging processing and the like.

The image data converting subsection 52 converts the image data, which was subjected to image processing in the image processing subsection 30, using a 3D (three dimensional)—LUT and the like so that the image data can be represented on the monitor 20.

The fine scanned image processing section 46 comprises an image processing subsection 54 and an image data converting subsection 58. The image processing subsection 54 comprises an LUT/MTX calculating unit 53 and an image correcting unit 56.

In the LUT/MTX calculating unit 53, performed on the fine scanned image data under the image processing conditions determined by using the prescanned image data are color balance adjustment, contrast correction (gradation correction), density correction and so forth using LUTs (lookup tables) and saturation and so forth using MTX calculation In the image correcting unit 56, further performed on the fine scanned image data are aberration correction processing on such as distortion aberration, lateral chromatic aberration and so forth caused by a photographing lens, magnification processing which expands and compresses an image in accordance with an output print size, sharpness processing, dodging processing and so forth.

In the data converting subsection 58, the image data subjected to image processing in the image processing subsection 54 is converted using 3D (three dimensional)—LUT and the like into an image data that as suitable for being outputted as a print from the printer 16.

The condition setting section 48 is used to read the prescanned image data from the prescan memory 40 for determining a fine scan reading condition and image processing conditions.

The condition setting section 48, first of all, calculates necessary image characteristic quantities from the image data obtained by prescanning all the frames in an original (negative film or the like) to be processed thereby calculating a fine scan reading condition as well as performing similar frame judgement processing between any individual frames described in detail later. The fine scan reading condition is set such that dynamic range of each of the line CCD sensors 34R, 34G and 34B of the CCD sensor 34 can be used in the widest range.

Then, the condition setting section 48, being based on the prescanned image data, constructs density histogram and the like, calculates image characteristic quantities such as average density, LATD large area transmission density), highlight (minimum density) and shadow (maximum density), as well as, in response to the operator's command that is optionally issued and determines various image conditions such as construction of a table (LUT) for the above-described gray balance adjustment and the like and an operation matrix for performing saturation correction whereupon, if it is judged that high similarity exists between any individual frames in the above-described similar frame judgement processing, image processing conditions (such as print correction parameters including density, color balance, gradation, contrast and the like) of the frames which were judged to have high similarity with each other in the above-described similar frame judgement processing operation are determined such that finishing of prints of these frames are the same with or similar to each other. Thus, the image processing conditions of each frame are set.

Figure 4:
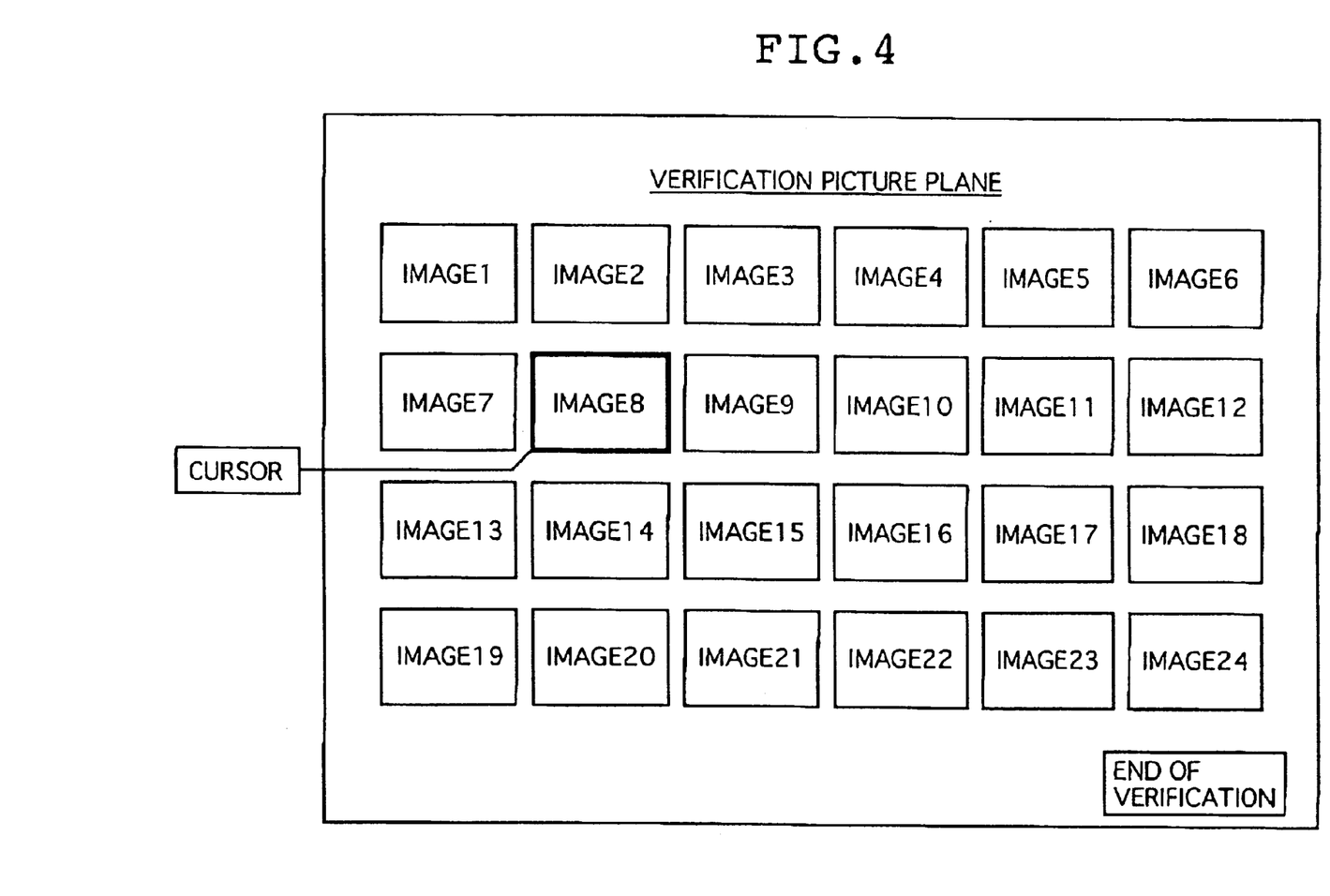
FIG. 4 is an explanatory illustration showing an example of verification picture plane represented on a monitor shown in FIG. 1.

Subsequently, image processing is performed based on the image processing conditions set in the image processing subsection 50 whereupon prescanned images of all the frames subjected to image processing are represented on the monitor 20 as a verification picture plane. An example of the verification picture plane is shown in FIG. 4. When looking at the verification, picture plane, the user or the operator (hereinafter, represented by user) performed a user's correction of the image processing conditions (print correction parameter) on a frame using the manipulating unit 18, the condition setting section 48 automatically performs the above-mentioned user's correction with different changeable in accordance with the degree of similarity even on a similar frame which was judged to be similar to the frame of interest at the above-mentioned similar frame judgement processing whereby the verification picture plane is represented newly again to perform the similarity verification processing.

In doing such way, when the user performed the user's correction of the image processing conditions (print correction parameter) on a certain frame on a verification picture plane, the condition setting section 48 automatically performs the above-mentioned user's correction with different density changeable in accordance the degree of similarity even on a similar frame on the verification picture plane so that it is avoidable for the user to take trouble to repeat a similar image processing adjustment to the similar frame.

When the user's adjustment is finished in this way, image processing conditions of each image are finally set.

FIG. 3 essentially shows sites related with image processing. In addition to the above sites, in the processing apparatus 14, arranged are a CPU which controls and administers the photoprinter 10 as a whole including the image processing apparatus 14, a memory which stores information necessary for an operation and the like of the photoprinter 10 and means for determining a stop-down value of the variable diaphragm 24, storage time of CCD sensor and the like at the time of fine scan.

Figure 5:
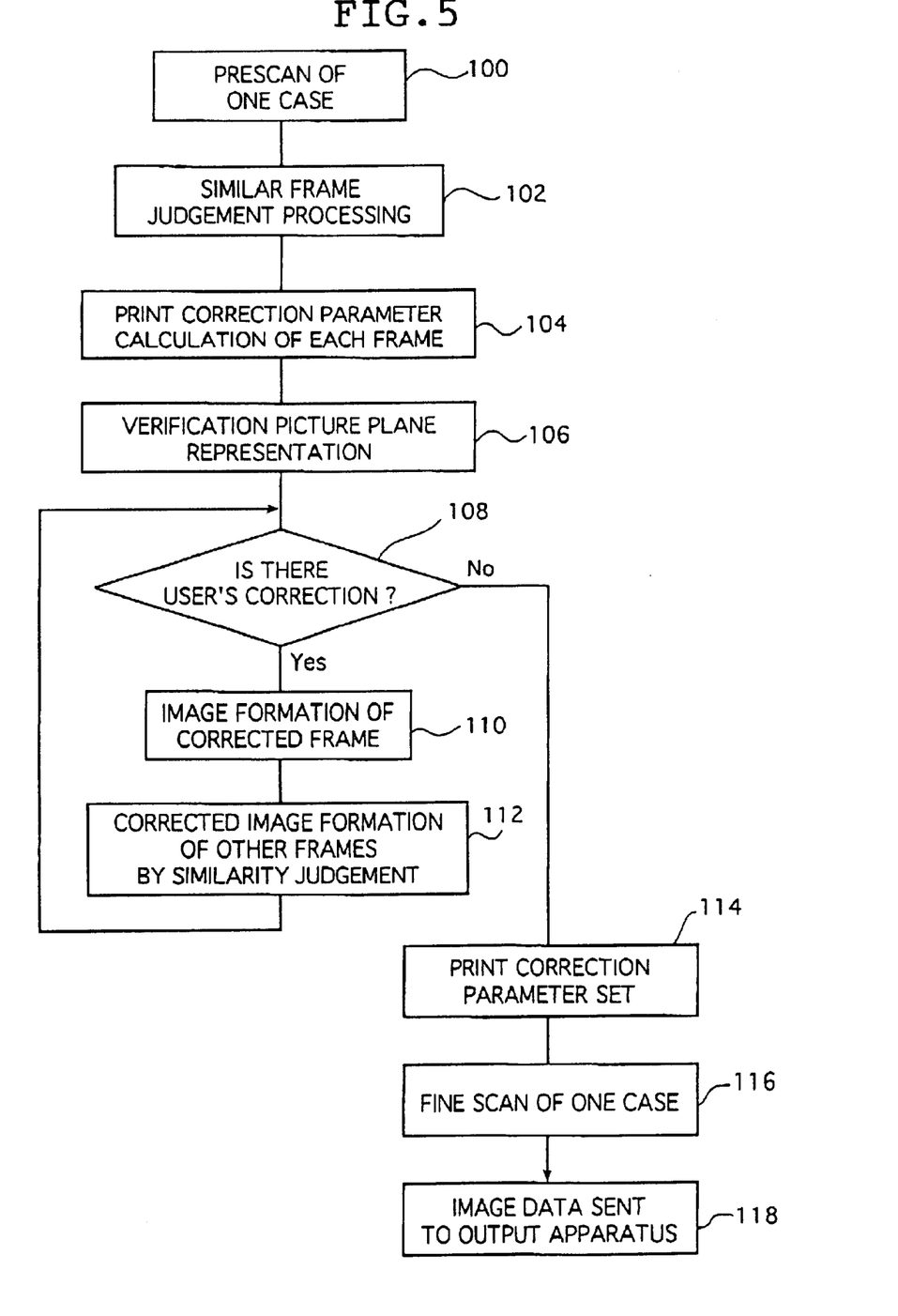
FIG. 5 is a flowchart for explaining an example of print image verification method according to the invention.

Now, a print image verification method of the invention will be described with reference to a flowchart shown in FIG. 5.

Prescanned image data of all the frames of one case (for example, one roll of film) read by prescanning with the scanner 12 which is regarded as an input (digital) image data is subjected at the processing section 38 to processing steps such as Log conversion, DC offset correction, dark correction, shading correction and the like and, thereafter, the thus processed image data is stored in the prescan memory 40 (step 100). The prescanned image data stored in the prescan memory 40 is read by the condition setting section 48 where a fine scan reading condition is first calculated and, subsequently, a similar frame judgement processing is performed (step 102).

The similar frame judgement processing is performed by calculating characteristic quantities such as average density, maximum density, minimum density and the like of respective R, G and B of each frame and, thereafter, comparing these calculated quantities. Alternatively, the similar frame judgement processing may be performed by constructing density histograms from image data and, $$Dij = \sum_{p=1}^{n} \{Ap \times |Xpi - Xpj|\} \quad (1)$$

$$Dij = \sum_{p=1}^{n} \{Ap \times (Xpi - Xpj)^2\} \quad (2)$$

thereafter, comparing forms of these constructed histograms. For example, a similarity relation quantity Dij between a frame i and a frame j is calculated by obtaining difference of characteristic quantities of the frame i and the frame j in each item and, then, adding absolute quantity or squared formula of difference of each item through the following formulae (1) and (2):

wherein p represents a number tagged to each item of characteristic quantities (number of items being n);

Ap represents weighting coefficient for characteristic quantity of item p;

Xpi represents characteristic quantity of item p of image frame of an i-th frame;

Xpj represents characteristic quantity of item p of image frame of a j-th frame.

For example, when the similarity between the i-th frame and j-th frame is compared based on the average densities corresponding to respective R, G and B, if the number of characteristic quantity of average density of R is taken as p=1; the number of characteristic quantity of average density of G is taken as p=2; and the number of characteristic quantity of average density of B is taken as p=3, the average density of R of the i-th frame comes to be X1i; the average density of G of the same frame comes to be X2i; and the average density of B of the same frame comes to be X3i and, moreover, the average density of R of the j-th frame comes to be X1j; the average density of G of the same frame comes to be X2j; and the average density of B of the same frame comes to be X3j. Therefore, when the above formula (2) is used, the similarity relation quantity Dij between the i-th and j-th frames is shown as follows:

$$Dij = A1(X1i-X1j)^2 + A2(X2i-X2j)^2 + A3(X3i-X3j)^2$$

The larger the quantity of Dij becomes, the smaller the similarity between the i-th and j-th frames becomes. The smaller the quantity of Dij becomes, the larger the similarity between the i-th and j-the frames becomes to the contrary. When the quantity of Dij becomes 0 (zero), the i-th frame and the j-th frame are the same. In the present embodiment, similarity which is shown by the number of between 0 to 1 is set using the quantity of Dij, for example, by the method to be described below such that the degree of similarity of 1 represents frames are completely the same with or very similar to each other and the degree of similarity of 0 represents frames are completely different from each other.

The uppermost similarity relation quantity is set as T and, if the similarity relation quantity Dij is T or more, the similarity is set as 0. Namely, in case of S=T−Dij, if S<0, S=0. At this point, when this quantity of S is applied, the similarity R is represented as R=S/T.

The similarity relation quantity Dij differs depending on whether above formula (1) or formula (2) is used, or on the characteristic quantity used for calculating the similarity relation quantity. However, if the similarity R shown between 0 to 1 using the similarity relation quantity is set, for example, by the above-described method, it is possible that similarity which does not change by a formula or characteristic quantity to be employed is set.

Using this setting method of the similarity, a storing processing is further performed in the similar frame judgement processing of the present embodiment. That is to say, in case of a first frame, the similarity between the first frame and each of frames from a second frame to the last frame is calculated and stored. With a second frame, the similarity between the second frame and each of frames from a third frame to the last frame is calculated and stored. In the same manner as in the above cases, the storing processing is sequentially performed on each frame. Therefore, with the i-the frame, the similarity between the i-th frame and each of the frames from an (i+1)-th frame to the last frame is obtained and stored.

At this time, if the similarity exists between any individual frames exceeding a specified number of frames, the above storing processing may be omitted. Namely, with reference to the first frame, if the similarity between the first frame and each of the second and third frames is 0.8 or more, the first to third frames are judged as being similar so that, omitting the storing processing on the second and third frames, the storing processing may be performed from on the fourth frame after having performed on the first frame.

In the above-described storing processing, when the similarity between a certain frame and another frame is obtained, weighting may be performed in accordance with a distance between any individual frames such that the similarity becomes smaller, as the distance between these frames becomes larger. For example, in the case that the number of frames in one case is N,; the distance between any individual frames is n; and weighting quantity is W, the weighting quantity W is set as W=(N−n)/N and, then, R×W, that is, a product of the similarity between any individual frames R by weighting quantity W, way be stored. This is because that, in the case of frames which are spaced apart from each other in more than a specified distance, frequency of a similar frame becomes lower.

Moreover, in the above-described storing processing, in the case of frames which are spaced apart from each other in more than a specified distance, calculation of the degree of similarity is forcibly omitted and the degree of similarity may be set as 0. This is again because that, if frames are spaced apart from each other in more than a specified distance, frequency of a similar frame becomes lower. Accordingly, a calculation is omitted, resulting in decrease of calculation work and memory quantity.

When, at a step 102, similar frame judgement processing is performed as described above, then, based on the prescanned image data read from the prescan memory 40 and the similarity determined in the similar frame judgement processing, image characteristic quantities of all the frames are calculated and the image processing conditions are automatically determined. In this case, image processing conditions (print correction parameters) of respective frames which have a relation of high similarity therebetween are determined depending on the degree of similarity such that the print image to be finished (and/or image to be represented on the monitor) become identical (same) between the frames or similar with each other, for example, image processing conditions become common between frames or similar with each other (step 104).

Under the thus determined image processing conditions, performed in the prescanned image processing subsection 50 are color balance adjustment, color density correction, contrast correction, saturation correction, aberration correction on such as lateral chromatic aberration, distortion aberration or the like caused by the photographic lens, sharpness processing as well as dodging processing (compression and expansion of density dynamic range). Thereafter, the thus processed image data is sent to the image data converting subsection 52 where it is converted using 3D (three dimensional)—LUTs and the like to be represented on the monitor 20 as the verification picture plane of all the frames as shown in FIG. 4 (step 106).

On the verification picture plane on the monitor 20, frames with high similarity therebetween are represented as the print image which is automatically processed and finished identically or similarly, or as the display image which is automatically processed and represented identically or similarly, for example, as images of same or similar quality which have been processed automatically under the same or similar processing conditions, depending on the decree of similarity.

Now, the similarity verification processing is performed. Namely, looking at the verification picture plane shown in FIG. 4. it is judged whether or not the user has performed the user's correction from the manipulating unit 18 (step 108).

Looking at images of the frames represented on the verification picture plane starting from the first frame (No. 1 image) in a sequential manner, the user judges whether a correction is performed or not. For example, if an eighth frame (No. 8 image) is corrected, a cursor on the monitor 20 is moved to the eighth frame by the manipulating unit 18 as shown. in FIG. 4 to correct image processing conditions (print correction parameters) by using a density key, a color key, or the like from the manipulating unit 18. In accordance with the correction entered from the manipulating unit 18 by the user, the verification picture plane of the eighth frame is represented anew (step 110) and, at the same time, all the frames behind the eighth frame which are similar to the eighth frame are, being linked with the processing of the eighth frame, automatically subjected to the user's correction with different intensity changeable in accordance with the degree of similarity stored by the above-mentioned storing processing whereby verification picture planes of these similar frames are also represented anew (step 112).

Take, for example, the case where the similarity degree of a ninth frame is 0.7 relative to the eighth frame and stored by the above-mentioned storing processing. When, for the eighth frame, for example, the user's correction quantity is entered by the density key as D to density correction quantity which is one of image processing conditions (print correction parameters), for the ninth frame which is linked with the processing of the eighth frame, the user's correction quantity of density correction quantity is entered as 0.70 whereby representation of the verification picture plane of the ninth frame is also automatically changed anew.

After the verification processing of the eighth frame is finished, the user moves to the verification processing of the next ninth frame and can judge whether the quantity of 0.7D of correction which has been performed in a linking manner is satisfactory or not. In many cases, correction of similarity is required to be performed on the similar frame so that such automatic correction which have been performed on the similar frame is in many cases satisfactory. Even in the case that the result of the similarity verification processing by means of linking manner has been inappropriate, the ninth frame is capable of being easily corrected in a discrete manner.

In the case that the ninth frame has further been corrected, though the ninth and eighth frames are similar frames, since the verification processing of the eighth frame has been finalized, the eighth frame is arranged such that it is by no means automatically corrected linking with processing of the ninth frame. In this way, in the similarity verification processing, even if the frame to which the user's correction has directly been performed is the similar frame, image processing conditions of the frame of interest will not be changed by the user's correction of the other frame.

Moreover, an example exists that a plurality of frames of one case of film represented over two or more verification picture planes. For example, images in 24 frames are represented in the verification picture plane shown in FIG. 4. If the number of frames in a roll of film is 36, first 24 frames are represented on the first verification picture plane whereas the remaining 12 frames are to be represented on the second verification picture plane. If a plurality of frames of one case is represented over two or more verification picture planes as described above, in the present embodiment, when the user's correction is performed on frames being presently represented in the verification picture plane, the similar frame in the next verification picture plane is arranged so as to be automatically corrected with different intensity changeable in accordance with the degree of similarity. However, it is a matter of course that linkage of the user's correction can be actuated only to similar frames being presently represented in the verification picture plane.

For the case that the verification processing to the similar frame is not expected to be performed in a linking manner in a certain case of film or a certain verification picture plane, it is preferable that such linking manner of the verification processing to the similar frame is changeable either to be active or inactive in accordance with each case of film or each verification picture plane, that is, changeable either to be capable of performing the similar verification processing or not.

In such way, when all the frames in one case are subjected to the similarity verification processing, the image processing conditions (print correction parameters) are finalized (step 114).

After the verification is finished, fine scan is performed under the set fine scan reading condition to read the image (step 116). The obtained fine scanned (digital) image data with high resolution is subjected, in the same manner as in the prescanned image data, to Log conversion, DC offset correction, dark correction, shading correction and so forth to be stored in the fine scan memory 42 as the fine scanned image data.

In an LUT/MTX calculating unit 53, the stored fine scanned image data is read from the fine scan memory 42, is subjected under the set image processing conditions to color balance adjustment, density correction, contrast correction, saturation correction and so forth and sent to an image correcting unit 56 where the processed fine scan image data is further subjected to aberration corrections on such as lateral chromatic aberration, distortion aberration and the like caused by the photographing lens, electronic magnification processing of the image in accordance with the output print size and, according to a user's order, sharpness processing as well as dodging processing (density dynamic range compression/expansion).

After various processings have been performed in an image processing subsection 54, the processed image data is sent to an image data converting subsection 58, converted datawise therein, processed into output:image data which corresponds to be outputted to the printer 16 and then outputted to the printer 16 (step 118).

The printer 16 comprises a recording device (print device) for exposing a light-sensitive material (photographic paper) and recording a latent image thereon and a processor (development device) for subjecting the exposed light-sensitive material to the specified processing and outputting the thus processed material as a print.

In the recording device, after the light-sensitive material is cut to a specified length in accordance with the print, a specified information is printed on the back surface of each cut light-sensitive material with a back print. Then, three kinds of light beams for R, G and B exposures which correspond to the spectral sensitivity characteristics of the light-sensitive material are modulated in accordance with the output image data supplied from the image processing apparatus 14 and deflected in the main scanning direction as well as the light-sensitive material is transported in the auxiliary scanning direction perpendicular to the main scanning direction whereupon the light-sensitive material is two-dimensionally scanned and exposed to record a latent image thereon and, thereafter, sent to the processor. After receiving the light-sensitive material, the processor performs specified wet development processings such as color development, bleach-fixing, rinsing and the like; the thus processed light-sensitive material is dried to produce a finished print; a plurality of prints thus produced are sorted and stacked in specified units, say, one roll of film.

The print image verification method of the invention is capable of being advantageously applied not only to the digital photoprinter shown in FIG. 1, but also to a conventional direct exposure (analog exposure) photoprinter.

As is known in the prior art, the direct exposure photoprinter focuses a protect light of an image recorded on a film on a light sensitive-material thereby exposing (printing) the light-sensitive material with the project light to produce a latent image thereon which is subsequently subjected to specified development processings for obtaining a print with a reproduced image of the image. recorded on the film. When the light-sensitive material is exposed with the protection light of the film, for the purpose of reproducing an appropriated image, an appropriate quantity of each of color filters of C (cyan), M (magenta) and Y (yellow) is inserted in a light path to perform color correction of the image, as well as the projection light quantity is adjusted by a diaphragm to perform density adjustment of image. Insertion ratios of respective color filters and adjustment quantity of the diaphragm are determined by the steps of, for example, photoelectrically reading the image recorded on the film to obtain image data (input image data), calculating image characteristic quantities of LATD, high lights, shadows and the like of the image and using the thus calculated characteristic quantities.

For applying the image verification method of the invention to the photoprinter of direct exposure (analog exposure), all of or a part of image data (input image data) obtained by photoelectrically reading the image recorded on the film is used for judging the degree of similarity between any individual frame as in the same way as described above and, thereafter, based on the judged similarity degree, the similarity verification processing is performed in tie same way as in the digital photoprinter whereby, based or the image processing conditions set by the above similarity verification processing, the above-described color adjustment and density adjustment of the image can be performed by inserting respective color filters in the exposure light path and adjusting the stop-down value and so forth.

The print image verification method of the invention is applicable not only to a digital image pick-up device, that is, the digital camera, video camera or the like which directly subjects image information to be recorded to photoelectric conversion without using the film to produce an digital signal that is then to be stored in an image data recording medium, but also to the image data obtained from various image data sources such as another photoprinter, its image processing apparatus, its image data storing apparatus, a computer and the like.

For applying the print image verification method of the invention to various image data supply sources including the digital image pick-up device such as the digital camera, video camera or the like, using all of or a part of the image data which is directly obtained by photographing the subject and read out of the image data recording medium or which is obtained from various other image data recording media, the similarity between any individual frames is judged in the same method as in the above-described method applied to digital photoprinter and, thereafter, based on the judged similarity, the similarity verification processing is performed in the same way as in the digital photoprinter whereby the verified image itself corrected by the above similarity verification processing or the image obtained by subjecting the image data to image processing under the image processing conditions set by the similarity verification processing may be output either into the printer or into another photoprinter.

Moreover, the image verification method of the invention is by no means limited to a case that the verified image is outputted from the photoprinter as the photographic print. It is applicable to a case that the verified image is represented on the image representation device such as CRT, LCD, or the like of another photoprinter, its image processing apparatus, its image data storing device, computer or the like whereupon the verified image data may be sent to these output image data receiving sites not only for producing a print but also for representation or may be sent to various other output image data receiving sites directly or through communication means; otherwise, the verified representation image may be recorded in various image data recording media and storing devices as an image file directly or by way of communication means.

The image verification method for the print image and the representation image of the invention has been described in detail with reference to various embodiments. However, the invention is by no means limited to the above-described embodiments and it is matter of course that various improvements and design modifications can be made without departing from the scope and spirit of the invention.

As described above in detail, according to the invention, using all of or a part of the image data which is obtained by reading images in a plurality of frames on the film original to be processed or which is obtained by directly photographing the subject and read from the image data recording medium, a image file or the like, the similar frame judgement for judging the similarity between any two frames is performed and, then, the image processing conditions are determined such that higher the nudged similarity the more similar the finishing of the print or the representation image; hence, unevenness of quality of the print or the representation image is decreased irrespective of the similar frame being consecutive or not to stabilize the finishing quality or the representation quality.

When, in order to allow the finishing or representing of the frame with high similarity to be the same, the verification picture plane is represented after image processing conditions are determined and the image processing conditions of a certain frame are corrected in accordance with the user's correction while the picture plane is being represented, the image processing conditions of the frame similar to the above certain frame are represented anew after the user's correction with different intensity changeable in accordance with the degree of similarity is automatically performed on the similar frame by the similarity verification processing so that the user can save the trouble of repeating the similar correction frame by frame and is able to confirm the correction automatically performed to the similar frame on the verification picture plane; hence, even if the similarity verification processing results in being inappropriate, a discrete correction can easily be performed thereby producing the print of stable finishing quality or the representation image of stable displaying quality.

Moreover, in the case that prints of a scene such as a landscape photographed over a plurality of frames are combined into one panorama photograph, that is, in the case of a combined photograph, the frame with high similarity can automatically be distinguished by the sensitivity judgement processing so that finishing of the print can easily be made same whereupon the photograph of high quality can be obtained. In the same way, when the similar pictures are taken changing only samples such as in photographs of product samples or commercial photographs, the finishing of the similar frames can easily be made same so that the print of good quality can be obtained.

What is claimed is:

1. A print image verification method, comprising:

performing similar frame judgment processing for judging similarity between any individual frames using all of or a part of image data which is obtained by reading images in a plurality of frames on a film original to be processed or which is obtained from an image data recording media;

setting image processing conditions such that print finishing of frames with high similarity therebetween is the same with or similar to each other;

representing in a verification picture plane verification images of the frames which have been subjected to image processing under the thus set image processing conditions; and performing similarity verification processing such that, when a user's correction of said image processing conditions is performed on a certain frame, the image processing conditions of a similar frame or similar frames which have been judged to be similar to said certain frame at said similar frame judgment processing can also automatically be subjected to the user's correction with different intensity changeable in accordance with a degree of similarity, wherein the user's corrected verification images are represented on the verification picture plane.

2. The print image verification method according to claim 1, wherein said image processing conditions include at least one of density, color balance, gradation and contrast.

3. The print image verification method according to claim 1, wherein, once the user's correction of the image processing conditions is performed on said certain frame, the image processing conditions of said certain frame are not automatically charged by the user's correction performed on image processing conditions of other similar frame or frames which is similar to said certain frame.

4. The print image verification method according to claim 1, wherein said plurality of frames to be judged in said similar frame verification processing is one case of film original or one case of image data recording media.

5. The print image verification method according to claim 1, wherein said images in said plurality of frames are represented over a plurality of said verification picture planes.

6. The print image verification method according to claim 5, wherein, at said similarity verification processing, when the user's correction is performed on a frame within one of said verification picture planes, other similar frame or frames in said one verification picture plane and the similar frame or frames within other verification picture plane are subjected to the user's correction with different intensity changeable in accordance with the decree of similarity to represent said verification picture anew.

7. The print image verification method according to claim 1, wherein whether said similarity verification processing is performed or not performed can be switched on a basis of each case of said film original or said image data recording media or on a basis of each verification picture plane.

8. The print image verification method according to claim 1, wherein, in said similarity verification processing, when other frame or frames within one verification picture plane is similar to one frame within said one verification picture plane, a function which represents in said one verification picture plane at least one of a mark showing that the other frame or frames is similar and a degree of similarity of the other frame or frames is provided.

9. The print image verification method according to claim 1, wherein, in said similar frame judgement processing, when the degree of similarity between any individual frames is judged from said image data, weighting is performed in accordance with a distance between any individual frames such that the degree of similarity becomes smaller as the distance between any individual frames becomes larger.

10. The print image verification method according to claim 9, wherein, when said distance between any individual frames is larger than a specified distance, calculation of the similarity is forcibly omitted and the similarity becomes 0.

11. The print image verification method according to claim 1, wherein said image processing conditions themselves set by said similarity verification processing are sent to an output apparatus for printing the image in the frame on said film original and for outputting a print image.

12. The print image verification method according to claim 1, wherein a verification image data itself which has been corrected by said similarity verification processing is sent to an output apparatus for printing the image in the frame on said film original and for outputting a print image.

13. The print image verification method according to claim 1, wherein said image data is subjected to image processing in accordance with the image processing conditions set in said similarity verification processing and, thereafter, is sent to the output apparatus for outputting the print image.

14. The print image verification method according to claim 1, wherein output image data obtained by performing output image reading after said similarity verification processing has been performed is subjected to image processing in accordance with the image processing conditions set in said similarity verification processing and, thereafter, is sent to the output apparatus for outputting the print image.

15. A print image verification method, comprising:

prescanning a plurality of frames in a film original to be processed;

performing similar frame judgment processing for judging a degree of similarity between any individual frames based on a thus obtained prescanned image data;

setting image processing conditions such that print finishing of frames with degree of similarity therebetween is the same with or similar to each other;

subjecting a prescanned image in a frame to image processing under the thus set image processing conditions;

representing the thus processed prescanned image in said frame on a verification picture plane;

performing, when a user's correction of the image processing conditions is performed on a certain frame, the user's correction with different intensity changeable in accordance with the degree of similarity automatically on the image processing conditions of a similar frame which has been judged to be similar to said certain frame in said similar frame judgment processing and, thereafter, representing the corrected verification image on the verification picture plane;

performing fine scan to obtain fine scanned image data after said similarity verification processing is finished;

subjecting the thus obtained fine scanned image data to image processing under the image processing conditions set in said similarity verification processing; and sending the thus processed fine scanned image data to an output apparatus for outputting a print image.

16. An image verification method, comprising:

performing similar frame judgment processing for judging similarity between any individual frames using all of or a part of image data which is obtained by reading images in a plurality of frames on a film original to be processed or which is obtained from an image data recording media;

setting image processing conditions such that representation images of frames with high similarity therebetween is the same with or similar to each other;

representing in a verification picture plane verification images of the frames which have been subjected to image processing under the thus set image processing conditions; and performing similarity verification processing such that, when a user's correction of said image processing condition is performed on a certain frame, the image processing conditions of a similar frame or similar frames which has been judged to be similar to said certain frame at said similar frame judgement processing can also automatically be subjected to the user's correction with different intensity changeable in accordance with a degree of similarity, wherein the user's corrected verification images are represented on the verification picture plane.

17. A print image verification method, comprising:

performing similar frame judgment processing for judging similarity between any individual frames using all of or a part of image data which is obtained by reading images in a plurality of frames on a film original to be processed;

setting image processing conditions such that print finishing of frames with high similarity therebetween is the same with or similar to each other;

displaying on a display verification images of the frames which have been subjected to image processing under the thus set image processing conditions; and performing similarity verification processing such that, when a user's correction of said image processing conditions is performed on a certain frame, the image processing conditions of a similar frame or similar frames which have been judged to be similar to said certain frame is automatically subjected to the user's correction with different intensity changeable in accordance with a degree of similarity providing corrected verification images, the corrected verification images being represented on the display.

* * * * *